June 5, 1956
B. A. WILSON
2,748,545
HYDRAULIC ROLL GRINDER
Original Filed Feb. 15, 1949
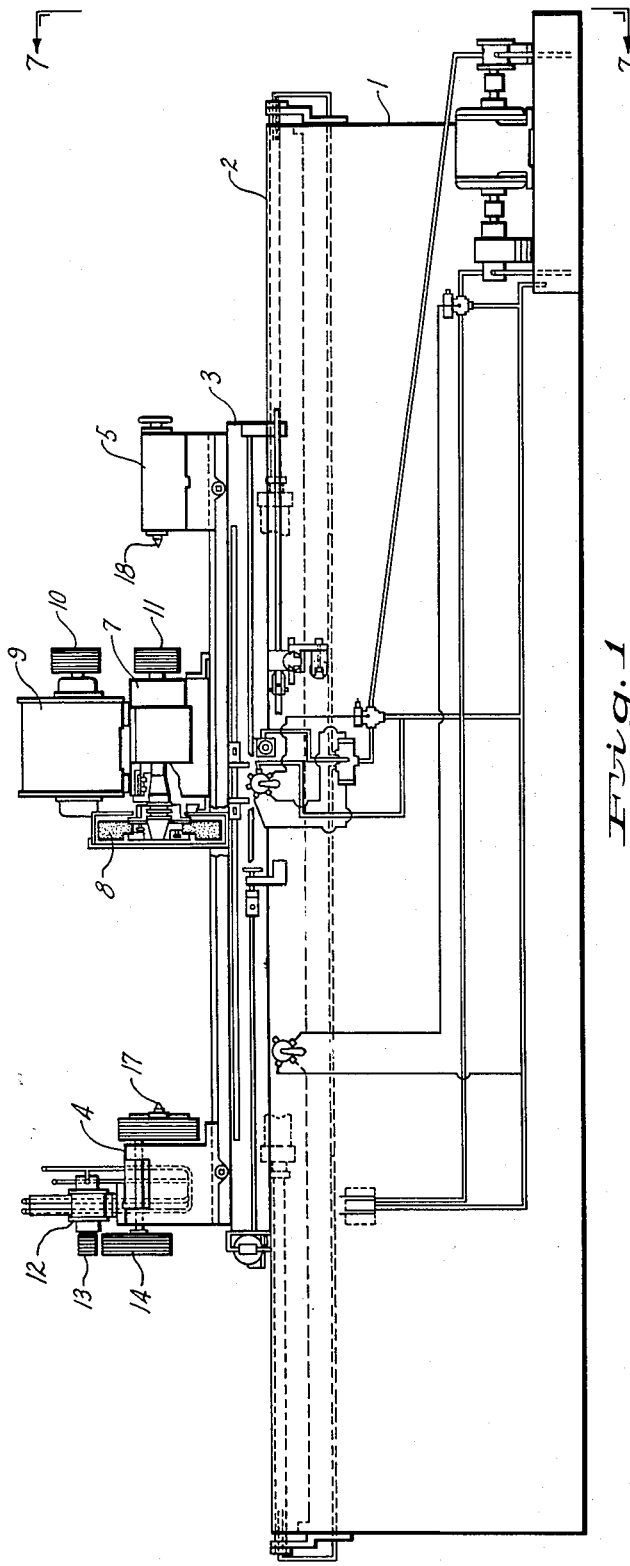
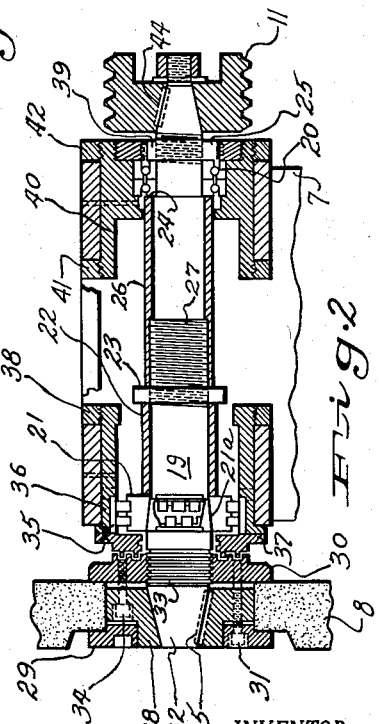
INVENTOR.
Bert A. Wilson
BY William B. Jaspert
Attorney.

United States Patent Office 2,748,545
Patented June 5, 1956

2,748,545

HYDRAULIC ROLL GRINDER

Bert A. Wilson, Pittsburgh, Pa., assignor, by mesne assignments, to Blaw-Knox Company, Pittsburgh, Pa., a corporation of Delaware Original application February 15, 1949, Serial No. 76,436. Divided and this application November 4, 1952, Serial No. 318,768

2 Claims. (Cl. 51—166)

This invention relates to new and useful improvements in cylindrical roll grinding machines especially adapted for use in grinding large rolls for rolling mills and the present application is a division of application serially numbered 76,436 filed February 15, 1949, that has matured as Patent 2,646,651.

In the accompanying drawings, constituting a part hereof, in which like reference characters designate like parts:

Fig. 1 is a front elevational view of the roll grinding machine unit; and

Fig. 2, a cross sectional view of the grinder head and wheel.

With reference to Fig. 1 of the drawings, the reference numeral 1 generally designates a grinder bed having ways 2 on which is mounted the grinder table 3 that carries a head stock 4 and a tail stock 5. Mounted on the bed 1 and behind the table 2 is a grinder base 6 on which is supported a carriage 7 for a grinding wheel 8 that is driven by a motor 9 through V-belts mounted on pulleys 10 and 11. The head stock 4 is driven by an hydraulic motor 12 by V-belts mounted on pulleys 13 and 14, the latter driving pulley 15 that drives the head spindle through pulley 16. The head stock and tail stock are provided with centers 17 and 18 on which the roll is to be ground.

The grinder head in which the grinding wheel is journaled is shown in detail in Fig. 2 of the drawing. The grinding wheel 8 is rotated by a spindle 19 journaled at one end in ball bearings 20 and at its other end in a multiple row staggered roller bearing 21. The inner race of bearing 21 is seated on a conical or tapered portion 21a of the spindle 19 on which it is held by a sleeve 22 and a lock nut 23. With the bearings 20 abutting the spindle shoulder 24 on one side and the ring nut 25 on the other, the spindle is locked against axial displacement. Bearings 20 may be pressed off spindle 19 by a sleeve 26 against which the nut 23 acts when turned on the threaded portion 27 of the spindle.

The grinding wheel collet or mount is made of three parts, a hub 28 and wheel flanges 29 and 30 between which the abrasive wheel 8 is clamped by bolts 31. The end of spindle 19 is tapered as shown at 32, behind which the spindle is provided with an acme thread 33 on which the wheel flange portion 30 is screwed. The wheel flange portion 30 is also provided with countersunk cap bolts 34, by which the hub 28 is securely attached thereto.

The outer race 35 of the multiple staggered roller bearing 21 is inserted in sleeve 36 in which it is held by end ring 37. Sleeve 36 is held in wheel slide 7 by nut 30, and one end of the bearings 20 is held in place by nut 39. A second sleeve 40 is held in slide 7 by nuts 41 and 42, in which is pressed the outer races of ball bearings 20, held by retaining nut 39 threaded into sleeve 40. The mounting of the abrasive wheel 8 by engagement at the hub portion only of the wheel provides clearance for shoulder grinding and permits wearing away of almost all of the abrasive, and the multiple roller bearings 21 at the grinding wheel end of the spindle, gives a smoothness to the spindle and grinding wheel not attainable by ball bearings, and the cause of chattering or vibration on the work is eliminated. The spindle is driven by a pulley or sheave wheel drive 11 as previously described which is keyed on the tapered end 43 of shaft 19 at 44 and the grinding wheel hub 28 is keyed on taper seat at the other end of shaft 19 at 45.

While the invention has been demonstrated as applicable to grinding of rolling mill rolls, it is evident that it may be used for any kind of grinding operations and especially for large industrial parts.

Although one embodiment of the invention has been herein illustrated and described, it will be evident to those skilled in the art that various modifications may be made in the details of construction without departing from the principles herein set forth.

I claim:

1. A grinder wheel head comprising a wheel slide having a pair of axially spaced sleeves, a grinding wheel spindle journaled in said sleeves by juxtaposed ball bearings at one end and a plurality of staggered roller bearings at the other, said spindle having a shoulder abutting the ball bearing races and having a tapered portion for mounting the roller races, a spacer sleeve disposed on said spindle abutting the inner roller race, a ring nut on a thread portion of the spindle for displacing the spacer sleeve to press the roller races on the tapered portion of the spindle, a nut for securing the ball bearing races on the shaft to lock the spindle against axial displacement, and a second sleeve on said shaft adapted to engage the ball bearing races and said ring nut for pressing the ball bearing races from the shaft by rotation of the nut.

2. A grinding wheel head comprising a wheel slide having a grinding wheel spindle mounted therein, said spindle having tapered ends for receiving a drive pulley and abrasive wheel respectively and having a tapered shoulder adjacent the wheel end for receiving a plurality of roller bearings, juxtaposed ball bearings at the other end of said spindle, a ring nut for securing said ball bearings, said spindle having a threaded portion intermediate the ends and a ring nut interacting with the threads thereof, sleeves disposed between and abutting the faces of said ring nut and roller and ball bearing races, said spindle having a threaded portion adjacent the tapering end on the wheel end of said spindle, a clamping plate mounted on said threaded portion, an abrasive wheel mounted on a hub having a tapered bore for mounting on the tapered end of the spindle, said hub being bolted to said clamping plate.

References Cited in the file of this patent

UNITED STATES PATENTS

| 1,984,718 | Wistrand | Dec. 18, 1934 |
| 2,239,567 | Nenninger | Apr. 22, 1941 |
| 2,397,178 | Wiken et al. | Mar. 26, 1946 |